May 3, 1932.  E. H. LANGE  1,856,219
AEROPLANE
Filed June 5, 1931  4 Sheets-Sheet 4

Inventor
Everett H. Lange
By Clarence A. O'Brien
Attorney

Patented May 3, 1932

1,856,219

UNITED STATES PATENT OFFICE

EVERETT H. LANGE, OF BRIDGETON, MISSOURI

AEROPLANE

Application filed June 5, 1931. Serial No. 542,420.

The present invention relates to an aeroplane and has for its prime object to provide means whereby the camber of the wing may be varied to increase or decrease the lifting capacity thereof.

Another very important object of the invention resides in the provision of a control mechanism whereby the leading edge member of the plane may be manipulated in unison with combination stabilizers and ailerons.

A still further very important object of the invention resides in the provision of an aeroplane of this nature which is simple in its construction, easy to manipulate and control, thoroughly efficient and reliable in flight and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 7 is a detail section through the shield for the control stick.

Figure 1:
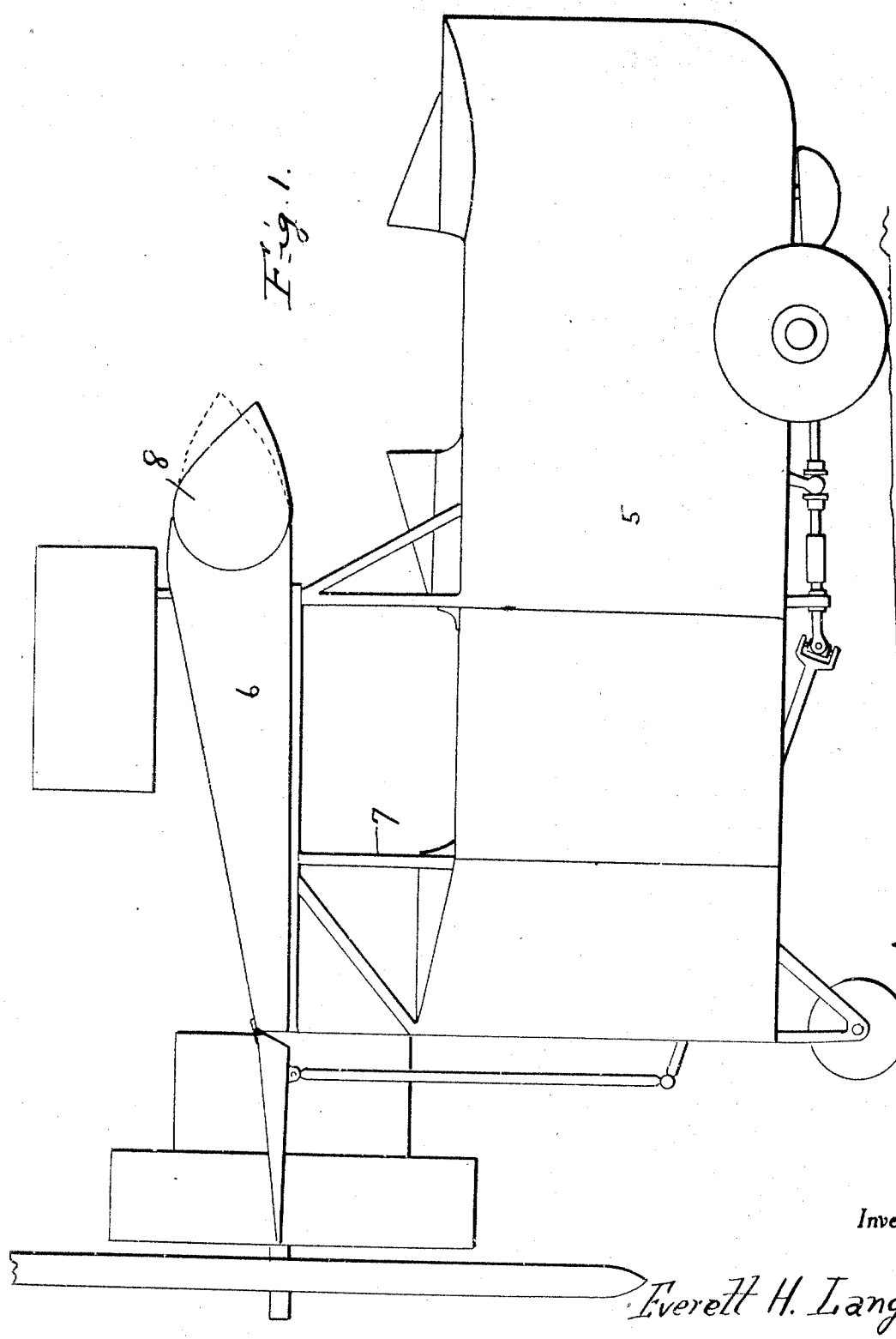
Figure 1 is a side elevation of an aeroplane embodying the features of my invention.
Figure 2:
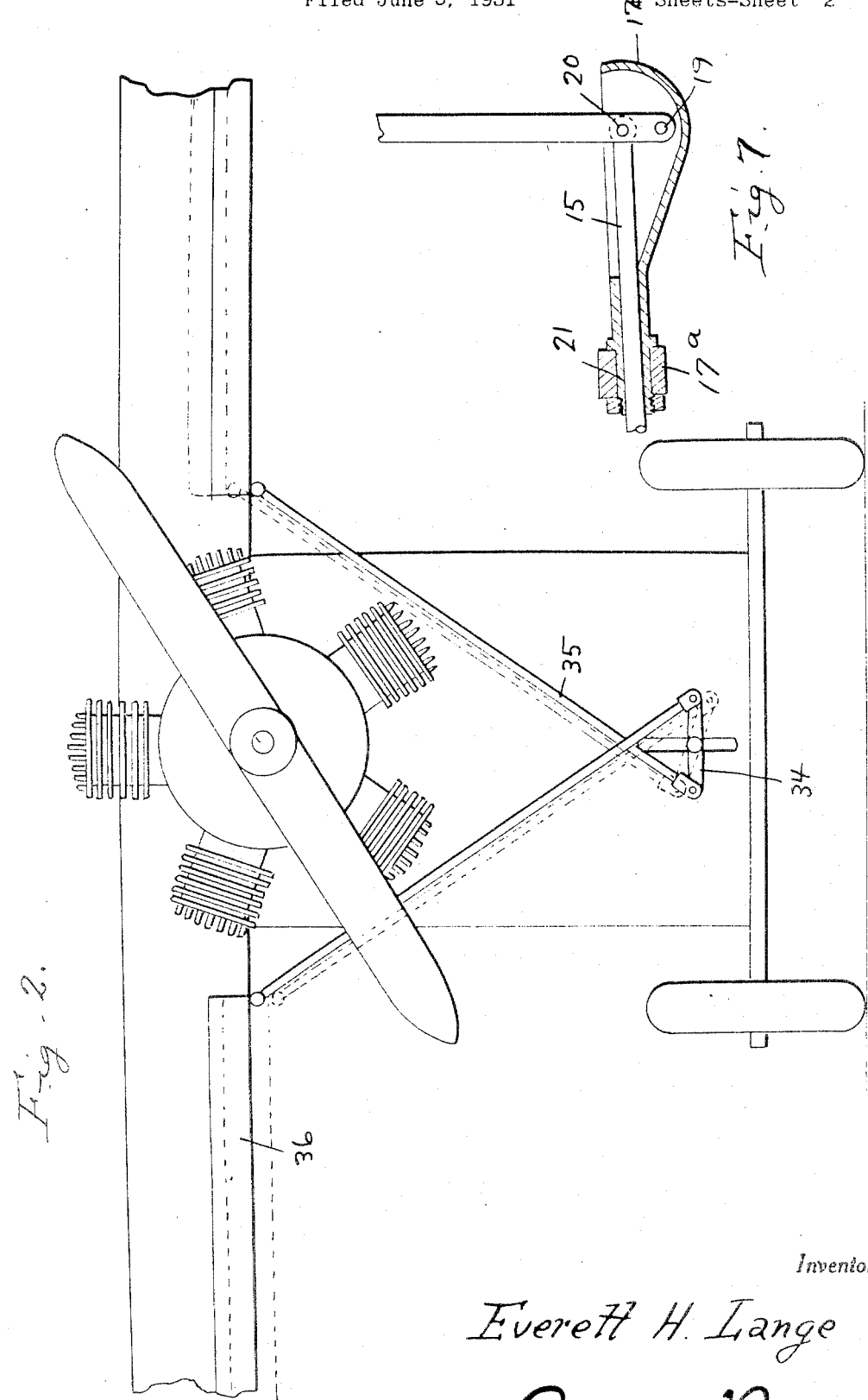
Figure 2 is a rear elevation thereof.

With reference more in detail to the drawings, it will be seen that the numeral 5 designates a fuselage above which is mounted a wing 6 by suitable struts 7 or the like. A leading edge member 8 is mounted in the front of the wing structure 6 on a shaft 10 which is rocked by a crank 11. A link 12 is connected with the crank and extends downwardly into the fuselage, and is connected with a bell crank 14. The lower end of the bell crank 14 is engaged with a slidably mounted shaft 15 between spaced collars 23 on said shaft 15. Shaft 15 is slidably mounted in a bearing 16, and a bearing 21 provided on one end of a shield member 17. Shield member 17 at said one end is rotatably mounted in a suitable bearing 17a suitably provided in the fuselage adjacent the forward end thereof.

The forward end of shaft 15 is pivotally connected as at 20 with a control stick 18 that is pivoted at its lower end within the shield 17 as at 19.

Shaft 15 consists of two alined sections connected together forwardly of the bearing 16 through the medium of a suitable coupling 26'. The rear end of the sectional shaft 15 has a universal connection 26 with a shaft 25, the rear end of which is supported in a bearing strap 27 depending from a link 28 that is connected to one end of a T-shaped lever 29 pivotally mounted within the fuselage. The remaining ends of the T lever 29 are connected through the medium of cables 30 that cross one another with a control lever 31, which cables 30 are connected to the lever 31 above and below the fulcrum 32 of said lever. A suitable rack segment and detent structure is provided for retaining the lever 31 at the desired adjustment.

A cross head 34 is provided at the rear end of the rod or shaft 25 and has cross links 35 engaged therewith and connected with the combination stabilizers and ailerons 36.

Figure 3:
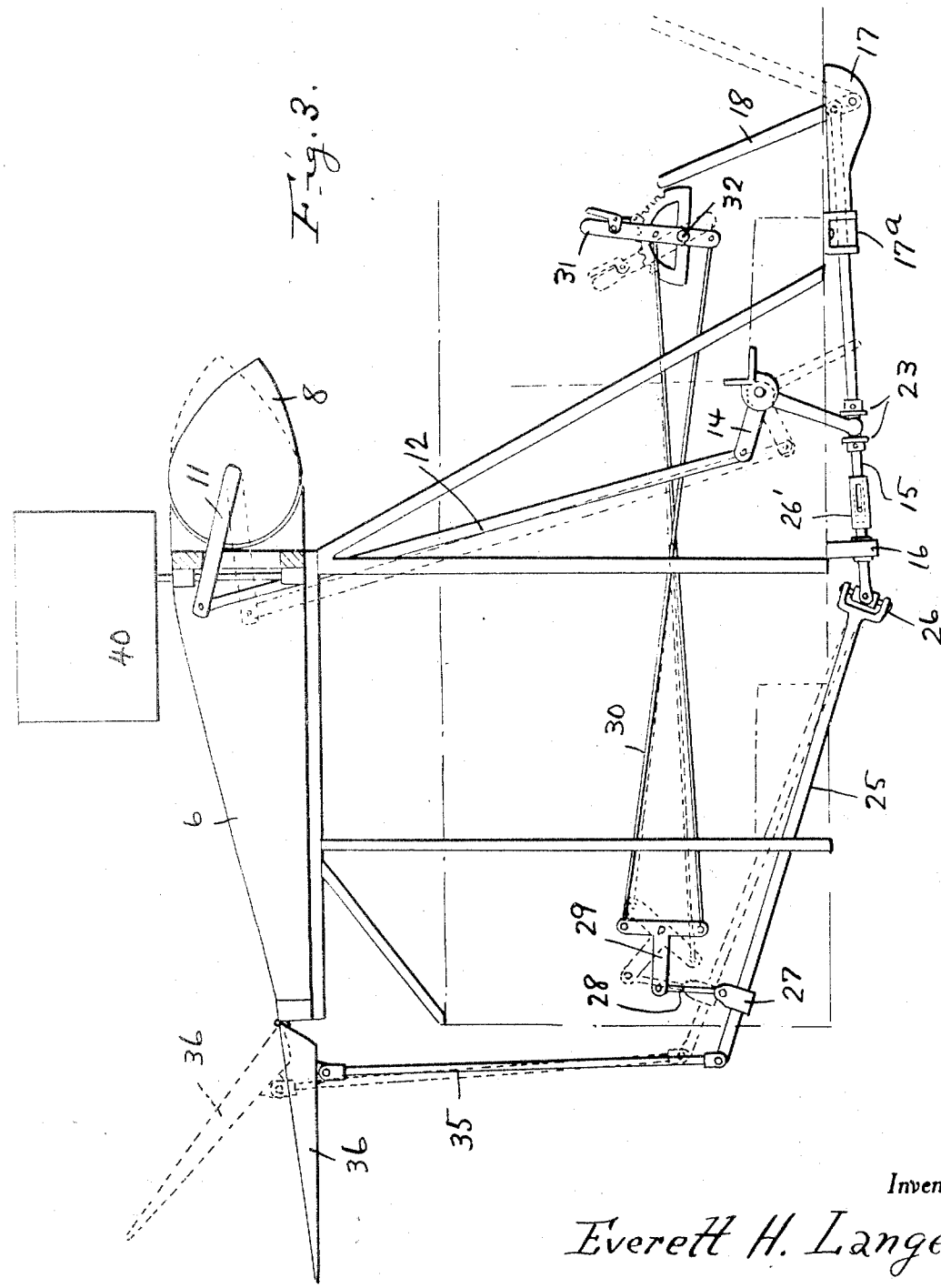
Figure 3 is a sectional diagrammatic view thereof.
Figure 4:
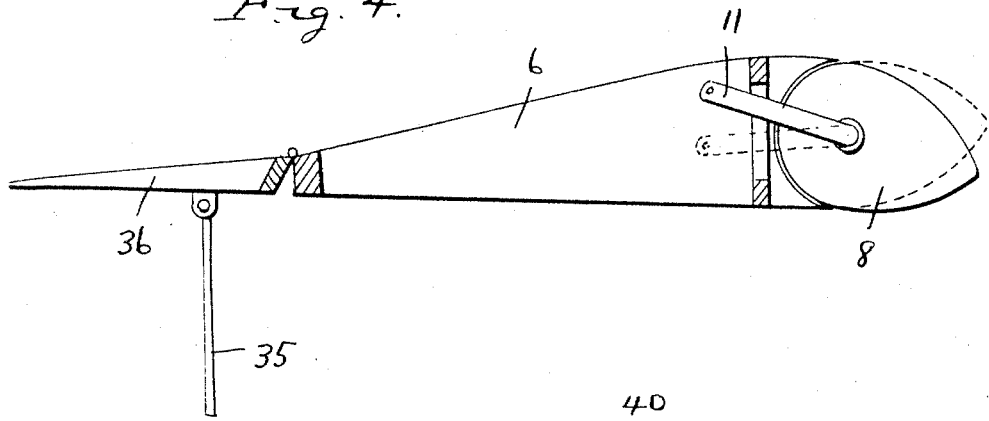
Figure 4 is a sectional view through the wing showing the parts in one position.
Figure 5:
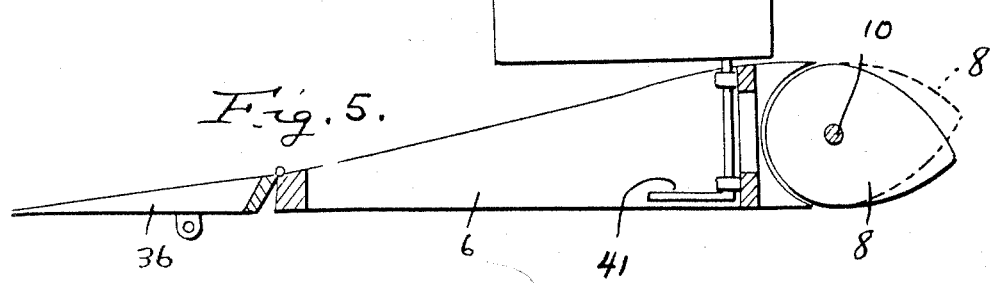
Figure 5 is a similar view showing the rudder.
Figure 6:
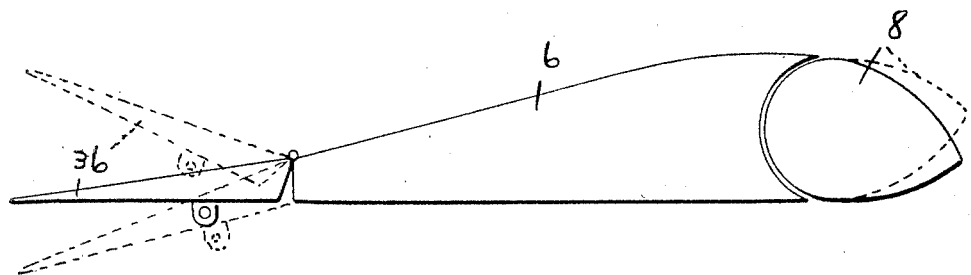
Figure 6 is an end view of the wing.

From what has been said hereinbefore, it will be apparent, that a variation in the camber of the wing 6, may be obtained by rocking the control stick 18 back and forth, for swinging the leading edge member 8 about a horizontal axis. Thus, with the leading edge 8 in the full line position shown in Figures 3, 4, 5 and 6 it will be seen that there is no camber or lift to the wing, but by pulling the stick 18 rearwardly the leading edge is cambered downwardly thereby giving maximum lift to the wing structure.

The combination stabilizers and ailerons 36 may be swung about their pivots by rocking the stick 18 toward the left or right thereby rocking the shield 17, shaft 15, shaft 25, movement of the shaft 25 being imparted to the combination stabilizers and ailerons 36 through the medium of the cross head 34 and links 35.

Raising or lowering of the combination stabilizers and ailerons 36 may be effected independently of the stick 18 and the elements associated therewith as just described, by manipulation of the lever 31 and they may be held at the desired adjustment by securing the lever 31 in the requisite adjusted position.

From the description of the operation, it will be then apparent, that the stick 18 when moved backwardly and forwardly gives complete longitudinal maneuverability by effecting a change in the camber of the variable wing structure, and rocking of the stick 18 toward the left or right gives lateral control through the combination ailerons and stabilizers. On the other hand, lever 31, through the medium of which the combination stabilizers and ailerons may be secured at the desired adjustment, provides for stability. Thus it will be seen that the wing and combination aileron and stabilizers may be easily controlled for increasing or decreasing the lift, and in the banking, turning and other maneuvers.

Suitably mounted above the forward portion of the wing 6, is a rudder 40, suitably mounted and controlled through the medium of a vertical crank shaft 41 which in turn is controlled through suitable means (not shown).

Even though I have herein shown and described the preferred embodiment of the invention, it is to be understood that the same is susceptible of changes, modifications and improvements coming within the scope of the appended claims.

I claim:

1. In an aeroplane, a wing having a leading edge member rockable therein, stabilizers rockable on the trailing edge of the wing, and means for operating the leading edge member and the stabilizers in unison for adjusting the effectiveness of the lifting capacity of the wing, said means comprising a crank on the leading edge member, a link connected thereto, cross links connected to the stabilizers, a rod, means for slidably and rockably mounting the rod, a stick for sliding and rocking the rod, means operatively connecting the rod with the first mentioned link to pull and push on the link when the rod is slid back and forth respectively, a second rod, universal connection between the rod, a cross head on the second rod to which the cross links are engaged.

2. In an aeroplane, a wing having a leading edge member rockable therein, stabilizers rockable on the trailing edge of the wing, and means for operating the leading edge member and the stabilizers in unison for adjusting the effectiveness of the lifting capacity of the wing, said means comprising a crank on the leading edge member, a link connected thereto, cross links connected to the stabilizers, a rod, means for slidably and rockably mounting the rod, a stick for sliding and rocking the rod, means operatively connecting the rod with the first mentioned link to pull and push on the link when the rod is slid back and forth respectively, a second rod, universal connection between the rods, a cross head on the second rod to which the cross links are engaged, a bearing strap through which the second rod is slidable and rockable, a T-shaped lever from one end of which the strap is extended, cables attached to the other ends of the T-shaped lever crossing each other and attached to opposite sides of a fulcrum of a control lever.

In testimony whereof I affix my signature.

EVERETT H. LANGE.